Figure 1:
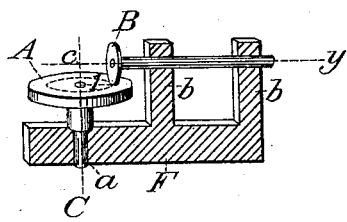

(No Model.) 4 Sheets—Sheet 1.

H. C. BEHR.
INSTRUMENT FOR MEASURING THE UNITS OF WORK DONE BY MACHINES.

No. 466,214. Patented Dec. 29, 1891.

Witnesses:
Emile A. Brandau
W. D. Bent Jr.

Inventor:
Hans C. Behr
By his Atty
John Richards (No Model.) 4 Sheets—Sheet 2.
H. C. BEHR.
INSTRUMENT FOR MEASURING THE UNITS OF WORK DONE BY MACHINES.
No. 466,214. Patented Dec. 29, 1891.
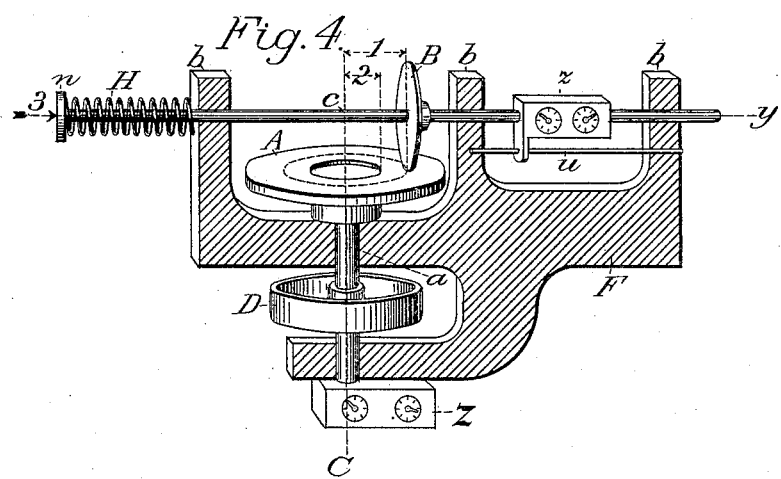
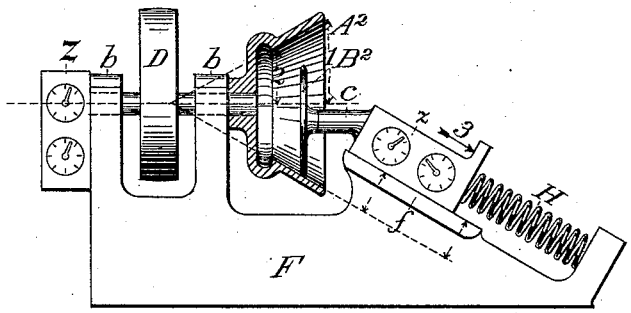
Witnesses:
Emile A. Braidau
W. D. Bent Jr.
Inventor:
Hans C. Behr
By his atty
John Richards (No Model.) 4 Sheets—Sheet 3.

H. C. BEHR.
INSTRUMENT FOR MEASURING THE UNITS OF WORK DONE BY MACHINES.

No. 466,214. Patented Dec. 29, 1891.

Witnesses: Emile A. Brandau, W. D. Bent Jr.

Inventor: Hans C. Behr
By his Atty John Richards (No Model.) 4 Sheets—Sheet 4.
H. C. BEHR.
INSTRUMENT FOR MEASURING THE UNITS OF WORK DONE BY MACHINES.
No. 466,214. Patented Dec. 29, 1891.
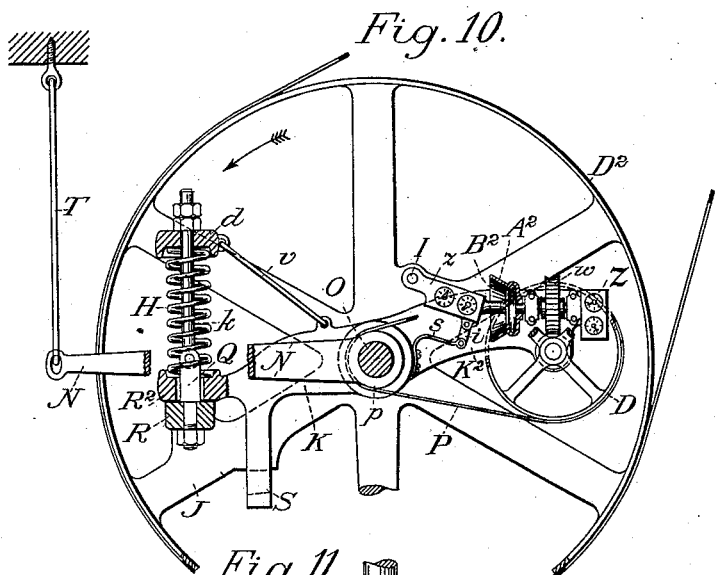
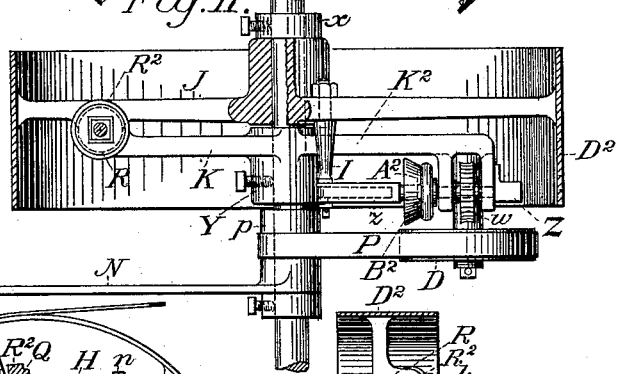
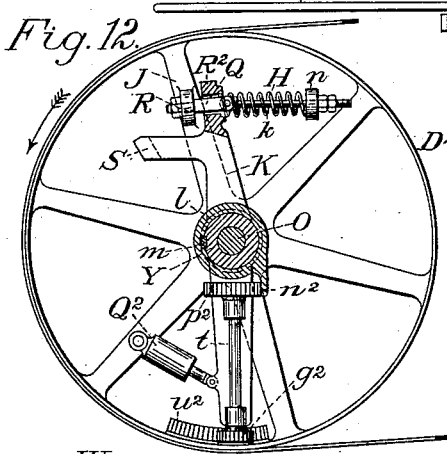
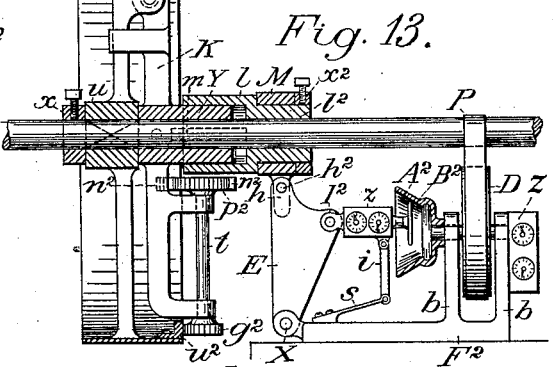
Witnesses:
Emile A. Brandau
W. D. Bent Jr.
Inventor:
Hans C. Behr
By his Atty
John Richards

UNITED STATES PATENT OFFICE.

HANS C. BEHR, OF SAN FRANCISCO, CALIFORNIA.

INSTRUMENT FOR MEASURING THE UNITS OF WORK DONE BY MACHINES.

SPECIFICATION forming part of Letters Patent No. 466,214, dated December 29, 1891.

Application filed June 12, 1890. Serial No. 355,212. (No model.)

*To all whom it may concern:*

Be it known that I, HANS C. BEHR, of the city and county of San Francisco, and State of California, have invented certain new and useful Improvements in Instruments for Measuring the Units of Work Done by or Through a Machine; and I hereby declare the following to be a full and clear description of the same.

My invention relates to apparatus whereby the units of work done by or transmitted through a machine are continuously counted, added up, or integrated, and the result indicated in numbers or counted on a dial at the end of any period of application, so the rate of counting must bear at any instant a constant relation to the product of the force acting at that instant through the machine, and of the velocity at which the force moves at the instant. If, then, the force or the velocity or both of these vary, the rate of counting will vary with them, and as the result of the counting is the sum of all the rates of counting, and as also the work done is the sum of all the forces acting through an instant of time multiplied by the velocity of the force at that instant, therefore the indicated result will bear the same constant relation to the work done as the rate of counting at any instant bears to the product of velocity and force acting at that instant.

The object of my invention is to provide an apparatus to measure and register the amount of work done by or through a machine in foot-pounds or other units of work during the time of application of said apparatus, and in such a manner that it shall perform all of the functions otherwise requiring extensive observations, measurements, and calculations, and give only the final result in numbers, so that any one unskilled in such measurements can read off the results at once.

In order to render the construction and operation of my apparatus clear, it will be necessary to employ diagrams to illustrate various mechanical movements embodied in instruments already in use as well as my own improvements; and to this end are presented the following drawings, forming part of this specification, in which—

Figure 2:
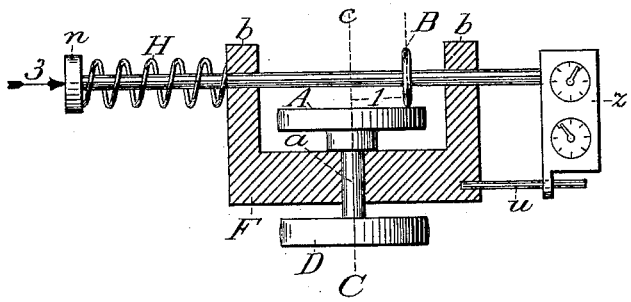
Figure 3:
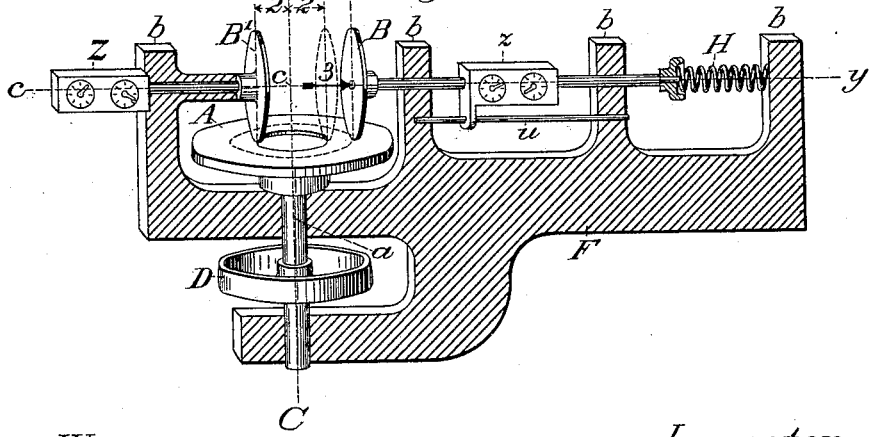
Figure 6:
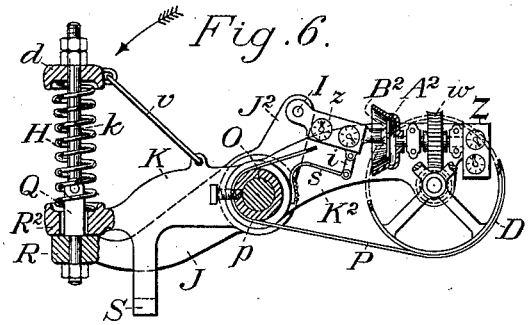
Figure 7:
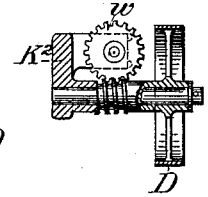
Figure 8:
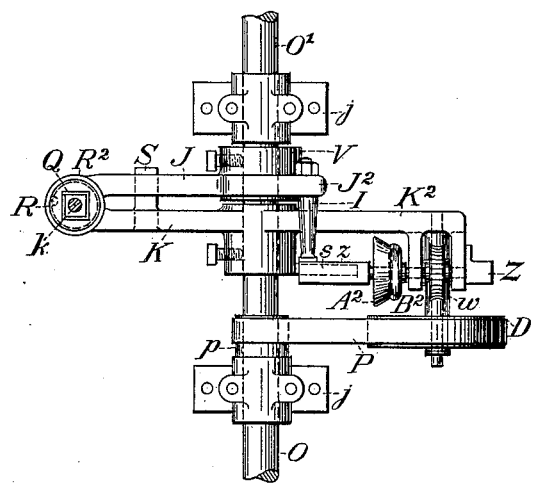
Figure 9:
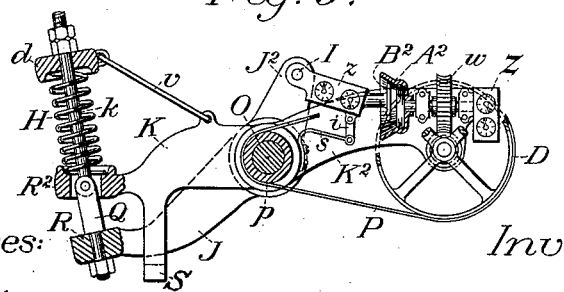

Figure 1 illustrates frictional disks for transmitting rotation one to the other in varying relations as their relative position may determine. Fig. 2 shows two similar frictional disks combined with a force tending to alter their relative rotation, and also mechanism to count and indicate the amount of rotation of the driven disk, the initial position of the latter being at the center of the driving-disk. Fig. 3 shows another apparatus with one driving-disk and two driven disks, one of the latter being kept at a constant distance 2 from the center of the driving-disk, while the position of the other is variable. Each of the driven disks operates a counter upon its axis and the difference of the readings of these counters gives the units of work done. Fig. 4 shows a simpler construction of the same apparatus, in which the one disk is omitted and its counter transposed so as to connect with the axis of the driving-disk. Here also the difference of the readings of the two counters gives the units of work done. Fig. 5 shows an apparatus the same in principle as that shown in Fig. 4, but with an arrangement of the frictional surfaces to counteract more completely any tendency of slipping of the frictional surfaces. Fig. 6 shows the application of the apparatus explained in previous figures to a rotating shaft for measuring and registering the units of work transmitted. Fig. 7 is a detail view of the device represented in Fig. 6. Fig. 8 is a plan view of the device shown in Fig. 6. Fig. 9 is the same as Fig. 6, but showing the registering mechanism under tension and in the position of registering work being transmitted. Fig. 10 shows my invention applied to a band-pulley for measuring and registering the units of work transmitted from the pulley to a shaft, or from the shaft to the pulley and the registering mechanism with which it revolves. Fig. 11 is a plan view of the device shown in Fig. 10. Fig. 12 shows my invention applied to a band-pulley in such a manner as to permit the registering mechanism to remain stationary, so as to be ready at any time. Fig. 13 is a side view of the device shown in Fig. 12.

The various figures lead up by progressive stages from the simple elements to my complete apparatus, which I now proceed to explain by the aid of the drawings and letters of reference marked thereon.

Referring first to Figs. 1 and 2, let F represent a rigid standard with journal $a$ for disk A and journals $b\,b$ for disk B. Let disk B be in frictional contact with disk A, so that any rotation of disk A about its axis will cause rotation of disk B about its axis, excepting when the point of contact is at the central point of disk A. The motions of which these disks are capable relatively to the standard F are as follows: Disk A may be rotated about its axis $C\,c$, disk B about its axis $c\,y$, and also translated in the direction of its axis $c\,y$. Suppose the disk A to be rotated about its axis; then for any given position of disk B the amount of its rotation will be a fixed multiple or fraction of the amount of rotation of the disk A. In varying the position of B this multiple or fraction will be changed with reference to A, but it will bear a constant relation to the distance between the point of contact between the two disks and the center of the disk A. It follows, therefore, that the amount of rotation of disk B is at all times a fixed multiple of the product of the amount of rotation of A and of the distance between the point of contact and the center of disk A.

In order to apply the device just described to the measurement and registering of work in a machine, it becomes necessary, first, to cause the distance 1 between the center of disk A and the point of contact of disk B with A always to bear a constant relation to the magnitude of the force transmitted; second, to cause disk A to rotate at a rate bearing a constant relation to the rate of motion of the force-transmitting elements of the machine; third, to connect the axis of B with some counting mechanism to register the amount of its rotation, which necessarily from what has been said is proportional to the amount of work transmitted through the machine.

The distance 1 between the center of disk A and the point of contact of disk B with A can best be made proportional to the force either as a whole or only a constant fractional part of the whole, as in the case of a steam-engine indicator, through a spring whose deflection bears a constant relation to the load imposed upon it. Fig. 2 illustrates the principle involved. The force 3 here acts upon the end of the axis of the disk B. The spring H, interposed between the collar $n$ and the bearing $b$, is compressed by the force 3 until it balances the latter, and if the spring is so constructed that its change of length is proportional to the force acting upon it the disk B will be translated axially until its point of contact is at a distance 1 from the center of A, which distance 1 is proportional to the force 3 if the initial point of contact is at the center of A. The disk A is rotated by means of pulley D at a rate bearing a constant relation to the rate of motion of the force through the machine. B being rotated by contact with A, the total amount of its rotation is due and proportional to two causes: first, to the distance 1 or to the force 3 causing that distance; second, to the rate of rotation of A or to the velocity. The amount of rotation of B is therefore proportional to the force multiplied by the distance through which it has acted or to the work done. The rotation of B is counted or added up by means of a simple arrangement of counter-dials $z$, driven from the axis $c\,y$ of B. In Fig. 2 the counter is shown suspended upon the axis and is translated with it, but is prevented from rotating with it by the peg $u$.

The disk B, Fig. 1, is liable to slip upon A when the point of contact is near the center of A, where the arc described upon A has a very sharp curvation at right angles to the plane of B, so that a kind of boring action is produced, which rapidly destroys the face of A and the edge of B.

The preceding diagrams and explanations refer mainly to apparatus heretofore known and in use.

Proceeding now to describe my own improvements, I chose the initial point of contact of the disk B, Fig. 3, with the disk A, so that the point of contact, when the force transmitted is zero, will be at some distance from the center of A. Thus the degree of curvature of the path relatively to the plane of B is not so great. 2 in Fig. 3 is the initial distance for which the force is zero. Since, however, the disk B will be rotated by contact with A at the distance 2, the amount of rotation due to 2 must be deducted from the total registration of counter $z$. This can be accomplished by using a second driven disk B', which is kept with its point of contact upon A at the same distance 2 from the center of A, and which moves a counter Z, indicating in numbers upon a dial the same amount as the dial $z$ would register if the disk B were kept at the constant distance 2 from the center of A. It will be observed that the amount of rotation of disk B' will depend only upon the amount of rotation of disk A, which rotation is proportional to the velocity with which the force element of the work done is transmitted, while the amount of rotation of disk B will depend both upon the amount of rotation of disk A, also upon the distance of its point of contact with disk A from the axis of disk A, which distance is made to depend upon the magnitude of the force transmitted. If now the disk B is translated in the direction of its axis $c\,y$, so that its point of contact with A is at a different distance 1 from the center of A, then the counter $z$ will register an amount proportional to the distance 1, while the counter Z still registers proportionally to 2. It is evident, also, that the difference of the registrations of the counters $z$ and Z is proportional to the difference of the radii 2 and 1. By arranging the device, as in Fig. 3, with a spring H, which, when not under strain or when the force 3 is zero, shall just bring the disk B to the distance 2 from the center of A, and by giving the disks A and B' rotation, which is proportional to the space passed over by the force-transmitting machinery, all the elements of registration of the work done are obtained, as in Figs. 1 and 2, only that in my apparatus shown in Fig. 3 it is necessary to take the difference of the readings of the two counters in order to arrive at the amount of work done.

The mechanism shown in Fig. 3 serves merely to explain more clearly the principles involved in my invention. To simplify the apparatus I omit the disk B' and operate counter Z from the axis $a$ of the disk A, as shown in Fig. 4.

In my improvements to avoid entirely the curvature of the path relative to the plane of the disk B, I employ wherever possible a hollow truncated cone $A^2$, Fig. 6, to take the place of the disk A, Fig. 4. The axis of cone $A^2$ is parallel, or nearly so, to the axis of disk $B^2$, so that the plane of rotation of both the driving and driven elements are the same. The employment of a surface curved so as to surround the disk $B^2$ also secures the important advantage that the curvatures of the driving and driven elements are more nearly coincident, and slipping is less liable to occur. While the axis of the disk $B^2$ is preferably parallel to that of the cone, the relative motion of translation must be parallel to a generating-line of the conical surface. This can be accomplished by carrying the counter $z$ in the guide $f$. When no force is acting upon the spring H, the latter just keeps the disk $B^2$ at the end of the truncated cone, and if the machine moves the registration of the counter $z$ is proportional to 2, and Z is made to coincide with $z$ for this point, showing that no work is transmitted; but when force is transmitted the disk $B^2$ is brought to a point corresponding to a different radius 1, while the counter Z still registers proportional to 2. By taking the difference of the two readings the work done is obtained as in the apparatus shown in Fig. 4.

It is evident that forms differing from the disk or cone may be used to attain the same object or that disks B or $B^2$ could be used as the element driven at the rate proportional to the speed of the force and driving the other disk or cone $A^2$ by contact. The initial point or point at which no force was transmitted would then be at the outer edge of $A^2$.

Coming now to the application of my improvements, in Figs. 6, 7, 8, and 9 is shown a registering-dynamometer coupling connecting the ends of two shafts O and O'. The ends of the shafts are supported in the journals $j j$. The arm J $J^2$ is secured by the hub V upon the shaft O'. The arrow shows the direction of rotation when O' is the driving-shaft. K and $K^2$ designate vibrating arms. In this case the arm J upon O' drags the arm K after it in rotation through the medium of the bolt $k$ and the spring H and collar $d$ on rod $k$, adjusted thereon by nuts on the screw-threaded end of said rod $k$. The tension of H is adjusted to be zero when the levers J and K are just touching together with their ends R and $R^2$. The spring H is so constructed that when work is done and force transmitted it will be compressed by an amount proportional to the force. The lug or arm $J^2$, formed with J, rotates with the latter relatively to K and $K^2$ when force is transmitted, and in so doing it carries with it by means of the stud I the end of counter $z$ and slides the disk $B^2$ away from its initial position upon the driving-surface of cone $A^2$, thereby causing a greater amount of rotation of $B^2$, and therefore its registration upon the dials of $z$, while the counter Z, connected to the axis of cone $A^2$, registers the same amount as $z$ does when $B^2$ is in its initial position. The disk $B^2$ is pressed against the driving-surface of $A^2$ by the spring $s$, connected to the counter $z$ by the link $i$. The graduation and rate of rotation of the counters is so proportioned that they will represent units of work for a spring H of given deflection under a given tension. By taking the difference of the readings of the two counters $z$ and Z the work done is obtained. The cone $A^2$ can be rotated in any convenient manner.

In Figs. 6, 8, and 9 a worm-wheel $w$ (shown in Fig. 7) is fixed upon the axis of $A^2$ and is driven by a worm connected with a pulley D driven by a belt P. In order to rotate the pulley D relatively to the rotating arms the pulley $p$ is made stationary, being here connected to one of the bearings $j$. In order to prevent the spring H from being deflected outward by centrifugal force, the strap $v$ is provided, connecting the cap $d$ to the arm K. That the apparatus may not be used for forces beyond the capacity of the spring H, a bent lug S is formed on K in such a way as to limit the distance that J can recede from K.

Figs. 10 and 11 illustrate the application of my invention to a pulley. In this case the pulley is $D^2$, mounted loosely upon the shaft, being only confined axially by the set-collar $x$ and the hub Y of the arm K, which latter is secured firmly upon the shaft and with its end $R^2$ bears against the end of spring H, the bolt $k$ having its hinged shank Q fixed in the lug R on the pulley-arm J. The stud I is carried by a part of the pulley. In other respects the apparatus resembles that illustrated in Figs. 6, 7, 8 and 9. The pulley D is rotated by the belt P from a small pulley $p$, mounted loosely upon the shaft and prevented from rotating with it by the arm N, the end of which is held in position by a rod T, secured to some stationary object. The arms K and $K^2$ are rigidly connected together on the same hub, the arm $K^2$ serving to support the pulley D, cone $A^2$, and counter $z$, the counter $z$, with disk $B^2$, being held by the rim I on a part of the pulley. The spring S, through the link $i$, serves to press the disk $B^2$ against the driving-surface of the cone $A^2$.

It may often be desirable to have the registering apparatus of the dynamometer detached from the rotating parts, so that it can be observed during the operation of the machinery. In such cases the device illustrated in Figs. 12 and 13 can be employed. Here the distance apart of R and $R^2$, which measures the tension of the spring, is transmitted axially to the sleeve $l$, moving upon the hub Y of the arm K, and carried around with it by the feather $m$. The axial motion of $l$ is obtained by a toothed segment $u^2$, fastened inside of the pulley-rim and engaging a pinion $g^2$, secured upon a shaft $t$, the other end of which also carries a pinion $p^2$, which engages with the rack $n^2$, formed on the sleeve $l$. The sleeve $l$ has a hub $l^2$, around which fits a collar M, inside of which $l^2$ is free to rotate. M is held in place axially upon $l^2$ by the set-collar $x^2$. The collar M is formed with a lug $h$, connecting with the pin $h^2$ to the triangular lever E, hinged upon the frame $F^2$ at X and connected at $I^2$ to the counter-casing $z$. The spring $s$ connects to the other end of the counter by means of link $i$, and serves to hold the disk $B^2$ against the driving-surface of cone $A^2$, which latter is driven by means of pulley D, driven by belt P from shaft O or from a small pulley secured to the same. When sudden fluctuations of power occur, a dash-pot $Q^2$ can be connected between the driving and driven arms.

To recapitulate, my improvements refer to a registering-dynamometer or work-meter having a driving-surface of revolution rotating with a velocity bearing a fixed ratio to the speed element of the work to be measured, which driving-surface rotates by frictional contact a disk the position of which along and upon a radius of the driving-surface is controlled by a spring through which the force element of the work to be measured or a fixed fractional part thereof is transmitted, the deflection of the spring bearing a fixed ratio to the force acting through it, so that a constant ratio is maintained between the change of position, and consequently of rotation of the driven disk, which latter moves a counter to indicate the units of work done.

A single counter only is employed, so far as I know, in methods hitherto proposed or in use, and the initial point of contact of the disk on the driving-surface of such instruments has been at the center of the driving-surface; but in my improved dynamometer or work-meter I choose the point at which no work is transmitted or the initial point of contact of the driven disk with the driving-surface at some given point not at the center of the latter. My improvement also includes the employment of two counters, one of which is operated by the driving-surface and the other from the axis of the driven disk.

What I claim, and desire to secure by Letters Patent, is—

1. In an instrument for measuring units of work done by a machine, the combination, with a hollow truncated cone carried by a shaft which actuates it, of a registering-disk located within the same and having its periphery in frictional contact with the inner surface of the said hollow cone, said disk being adjustable, so that it may be driven at various speeds in different positions, substantially as specified.

2. The combination, with a driving-shaft having a counter connected therewith, of a hollow truncated revolving cone actuated by said shaft and a registering-disk within the hollow cone, having its periphery in frictional contact with the inner surface of the cone, the shaft of said registering-disk being approximately parallel to the axis of the cone and being provided with a counter, substantially as described.

3. In a dynamometer or work-meter, the two counters $z$ and Z, the registration of one being proportional to the velocity with which force is transmitted through a machine to which the counters are attached, and the registration of the other counter depending on the intensity of the force transmitted as well as its velocity, so that the difference of registration between the two counters will indicate the work done, substantially in the manner and for the objects specified.

4. In a registering-dynamometer, the hollow inside of the cone and conical driving-surface $A^2$, in combination with a registering-disk $B^2$, driven by frictional contact at various speeds as the relative positions may determine, operating substantially as and for the purposes herein specified.

5. In a dynamometer or work-meter, the two counters $z$ and Z, the one Z being connected positively to the rotating parts of the machine and the other counter $z$ actuated by frictional connection with some rotating part of the machine in such a manner that its rate of registration will be at any instant of time dependent upon the intensity and also the velocity of the force transmitted through the machine, substantially in the manner and for the purposes set forth.

6. In a registering-dynamometer, the combination, with two shafts O and O', of an arm J $J^2$, secured by the hub V upon shaft O, an arm K, spring H, surrounding bolt $k$, having thereon cap $d$, connecting with arm K by strap $v$, the driving-cone $A^2$, driven disk $B^2$, counter $z$, connected to stud I, and the counter Z, connected to the axis of cone $A^2$, substantially as described.

7. In a registering-dynamometer, the combination of two shafts whose ends are intended to be coupled thereby, an arm J $J^2$ on hub V on one of these shafts, the arm K $K^2$, said levers J and K having their ends R and $R^2$ located in close proximity to each other, the spring H, surrounding the bolt $k$, the cap $d$ on said bolt, together with the nuts adjacent, the strap $v$, connecting cap $d$ with arm K, the driving-cone $A^2$, dial $z$, and disk $B^2$, which is pressed against the driving-surface of cone $A^2$ by spring $s$, connected to the counter $z$ by link $i$, and the counter Z, connected to the axis of the cone $A^2$, on which axis or shaft is a worm-wheel $w$, driven by a worm connected with a pulley D, driven by a belt P, substantially as described.

8. In a registering-dynamometer, the combination, with a pulley loose on a shaft, of the arm J $J^2$, the arm K $K^2$, said arms J and K having their ends R and $R^2$ located in close proximity to each other, the spring H, surrounding the bolt $k$, the cap $d$ on said bolt, the strap $v$, connecting the cap $d$ with arm K, the driving-cone $A^2$, dial $z$, and disk $B^2$, which is pressed against the driving-surface of cone $A^2$ by spring $s$, connected to the counter $z$ by link $i$, and the counter Z, connected to the axis of the cone $A^2$, on which axis or shaft is a worm-wheel $w$, substantially as described.

9. In a dynamometer or work-meter, the two counters Z and $z$, the one $z$ having a projecting spindle and a rotating disk $B^2$ driven by frictional contact with the interior of a truncated cone $A^2$, rotating relatively to the counter $z$, substantially in the manner and for the purposes specified.

In testimony whereof I have hereunto affixed my signature in the presence of two witnesses.

HANS C. BEHR.

Witnesses:
   ALFRED A. ENQUIST,
   W. D. BENT, Jr.